United States Patent [19]

Gerwin

[11] Patent Number: 4,519,382

[45] Date of Patent: May 28, 1985

[54] CONTROL SYSTEM FOR HELIOSTATS AND METHOD

[76] Inventor: Harry L. Gerwin, 14305 Ansted Rd., Silver Spring, Md. 20904

[21] Appl. No.: 504,350

[22] Filed: Jun. 14, 1983

[51] Int. Cl.³ .................... F24J 3/02; G01J 1/20
[52] U.S. Cl. ..................... 126/425; 250/203 R
[58] Field of Search ............. 126/424, 425; 353/3; 250/203 R

[56] References Cited

U.S. PATENT DOCUMENTS

| | | | |
|---|---|---|---|
| 4,031,444 | 6/1977 | Beck | 126/425 |
| 4,082,947 | 4/1978 | Haywood | 126/425 |
| 4,137,897 | 2/1979 | Moore | 126/424 |
| 4,320,288 | 3/1982 | Schlarlack | 126/425 |
| 4,354,484 | 10/1982 | Malone | 126/425 |

*Primary Examiner*—Samuel Scott
*Assistant Examiner*—G. Anderson
*Attorney, Agent, or Firm*—Jones, Tullar & Cooper

[57] ABSTRACT

A control system and method for a heliostat or a system of heliostats which operates to maintain the sunbeam properly centered with respect to an associated tracking head and tracks the sun for proper elevational and azimuthal orientation of the heliostat. The tracking date is stored in memory and utilized to reset the heliostat at night for proper orientation during the next days tracking and/or for proper orientation during sunless periods of the day. Each heliostat is therefore self-tracking.

7 Claims, 8 Drawing Figures

FIG.6

CONTROL SYSTEM FOR HELIOSTATS AND METHOD

TECHNICAL FIELD

This invention relates to a control system and method for heliostats, and in particular to a heliostat control system and method for a field of heliostats, which, once tracking acquisition by means of manual control has been achieved and once one full day's automatic sun tracking has been completed, will operate indefinitely, without human attention, to reflect the sunbeam from each heliostat so its beam is steadily shining on one spot, the opening of the solar receiver.

PRIOR ART

Considerable research and development has taken place in the last ten years in central receiving heliostat systems for generating electric power. A ten megawatt solar electric power plant has been built near Daggett, Calif. The plant utilizes 1800 heliostats. Each heliostat has a mirror panel area of 450 square feet. The heliostats are each controlled by a large computer. A smaller, one megawatt electric power plant is in operation in Italy.

Such large systems can well afford an expensive computer to control the heliostats. The computer is expensive, but the computer cost, percentage-wise represents only a small part of the total cost of the system. A small heliostat system, consisting of smaller heliostats with less collection area and fewer heliostats in the system requires a less costly heliostat control system to be cost-effective.

It would therefore be desirable to have a simple and low cost control system which is capable of controlling a heliostat system consisting of a small number of heliostats.

OBJECTS AND SUMMARY OF THE INVENTION

An object of the present invention is to provide a novel control means and method of controlling heliostats, in the field of heliostats, to track each heliostat in an automatic sun track mode in the azimuth and elevation axis so the sunbeam from the heliostat mirror is steadily reflected on one spot, the solar receiver opening, when the sun is shining;

A further object of the present invention is to provide the control means of the previously stated object with an appropriate memory in which the operational track of each heliostat, when it is tracking in the automatic sun track mode, is stored. The track for both the azimuth and elevation axis are remembered. The tracks for each heliostat can then be recalled from memory as required;

A still further object of the present invention is to track each heliostat from memory when the sun is obscured by clouds or fog. Thus, the heliostat track is continued during the sun obscured period. When the sun reappears, the sunbeam from the heliostat will be reflected to the correct spot when the automatic sun track mode is reinitiated;

A still further object of the present invention is to track the heliostats, from memory, during the night time operating period in a direction reversed from their day tracking direction. Thus, each heliostat is pointed correctly for automatic sun track operation when the sun appears in the morning; and A still further object of the present invention is to provide for manual control of each heliostat. By manual control of any manually selected heliostat in the field of heliostats, it can be moved in azimuth and elevation to point it for sun acquisition so the heliostat can commence operating in the automatic sun track mode.

The system approach used to achieve these objects includes making each heliostat a self-tracker. A tracking mirror is located at the top of each heliostat mirror panel. A tracking head is located just above the solar received opening. The control system operates to maintain the sunbeam from the tracking mirror centered on the face of the tracking head. The heliostat mirror, located just below the tracking mirror will therefore reflect its sunbeam into the solar receiver opening located just below the tracking head. Each tracking mirror is fitted with a motor-driven cover. This cover is normally down to cover the tracking mirror so it will not reflect the sun's rays.

A commutator system connects the electronics for each heliostat, in sequence, to the electronic control package, for a short tracking period. During the tracking period the tracking mirror is uncovered by the cover motor. This allows the sunbeam from the tracking mirror to illuminate the tracking head. The tracking head generates sun tracking error signals, thus heliostat tracking error signals. The sun tracking error signals are processed by the electronic control package which generates correction power pulses for the azimuth and elevation correction stepping motors in the heliostat mount. This drives the heliostat mirror panel in the direction required to correct the tracking error signal generated by the tracking head. The two corrections made, one in the azimuth axis and one in the elevation axis during the tracking period are each stored in their respective azimuth and elevation memories. Finally, the motor driven cover for the tracking mirror is returned to its normal down position so the sun's rays from the mirror no longer illuminate the tracking head. With the tracking mirror cover down and the stepping motors having corrected the heliostat mirror panel position, the automatic sun track period for this heliostat is ended. The commutator time controlled by the system clock, sequences to the next heliostat to repeat the time period for this heliostat. This process is continued for all the heliostats in the field.

Two additional system operating modes are desirable to support the above described sun track mode of operation. The two are, memory track and manual track.

The memory track mode of operation is used for two operating conditions. The first is to continue the heliostat track when clouds or fog cover the sun. Memory track, when the sun is obscured, keeps the heliostat mirror properly aligned to provide a smooth transition when the sun reappears and the basic sun track mode of operation is restarted. The second operational condition for the memory track mode is to track, in reverse, the day track, during the night time operating period. Reverse memory track during the night time operating period, repositions the heliostats to restart the sun track mode of operation when the sun comes up in the morning.

To track from memory, during the sun obscured and night track operating conditions, the memory must be loaded with the correct heliostat track. Memory loading or reloading to update the data in the memory is carried out whenever the system is operating in the sun track mode. The track which is loaded is the actual heliostat track followed during the sun tracking operation.

Stepping motors provide a fixed angular rotation each time they are stepped, thus in effect a digital output each time they are pulsed. The digital memory system remembers one bit of information for each tracking interval, for each heliostat for each axis. A stepping motor step, clockwise or counterclockwise is remembered as a "0" or a "1" in the memory system. The rate at which the tracking intervals occur is controlled by the system clock. The clock initiates the tracking period and it advances the memory counter.

The second additional mode of operation, the manual track mode is only used during the initial system set-up of the system or in reset-up after maintenance of the system. After a heliostat is installed or after maintenance is performed, the mirror panel is probably not oriented so sun tracking can commence. Manual track is used to position the panel for sun track acquisition. This is accomplished by a selector switch which is used to select the heliostat to be manually controlled and a second set of switches, one for elevation and one for azimuth control which are used to position the heliostat so sun tracking can commence.

BRIEF DESCRIPTION OF THE DRAWINGS

Eight figures have been selected to illustrate a preferred embodiment and the best mode of the invention. These are.

DETAILED DESCRIPTION OF THE PREFERRED EMBODIMENT

Figure 1:
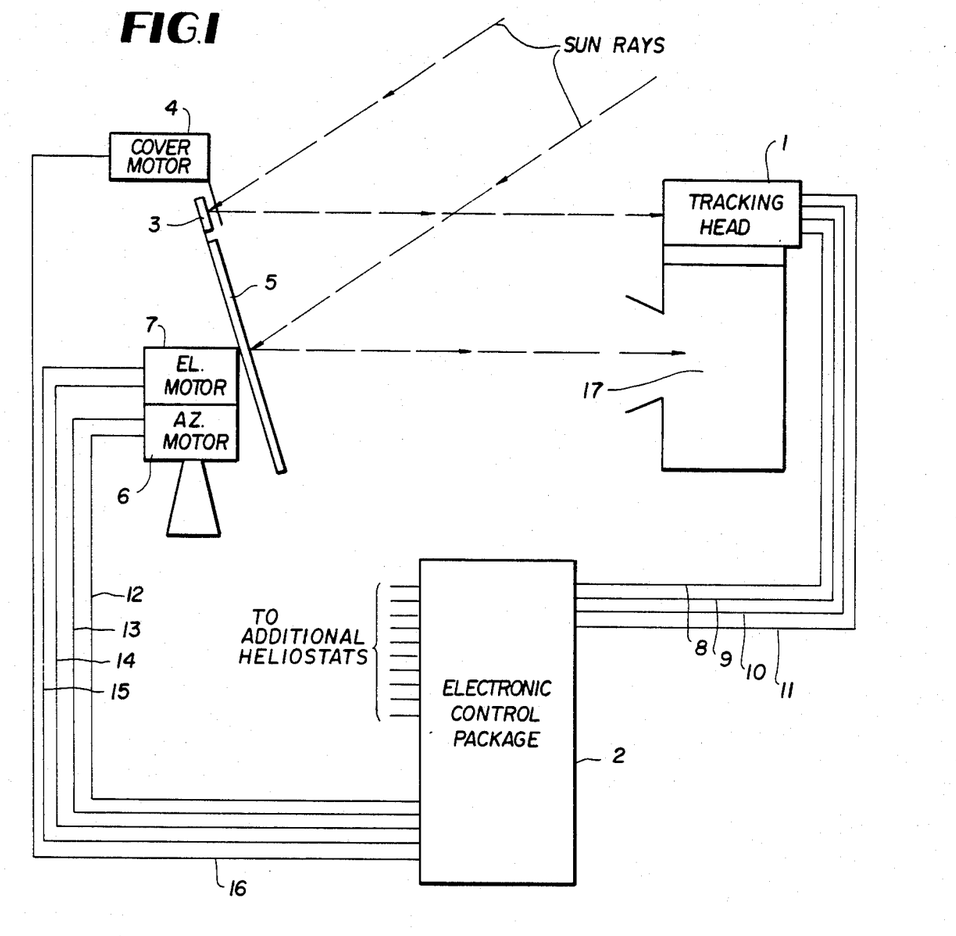
FIG. 1, which is a schematic block diagram illustrating the control system for one heliostat in the heliostat system, the sun ray paths and the physical location of the tracking mirror and the heliostat support panel which supports the heliostat mirrors and the location of the tracking head and the solar receiver of the present invention.

The basic heliostat control system is shown schematically in FIG. 1. The system generally comprises a tracking head 1, electronic control package 2, tracking mirror 3, cover with cover motor 4, heliostat support panel with mirrors 5, azimuth motor 6, elevation motor 7, azimuth and elevation sun tracking error signal line 8, 9, and 10, 11, azimuth and elevation power line 12, 13, and 14, 15, cover motor power line 16, and solar receiver 17. Only one heliostat unit is shown in the schematic diagram to simplify the discussion.

In the basic mode of operation, the sun track mode, of the control system shown in FIG. 1, the control system operates to track the heliostat support panel 5 so the sunbeams reflected from its mirrors are steadily directed into the opening of the solar receiver 17. To achieve this support panel tracking, the control system operates to maintain the sunbeam from the tracking mirror 3 centered on the face of the tracking head 1. The tracking head 1 is structurally attached to the solar receiver 17. The tracking mirror 3 is structurally attached to the heliostat support panel 5. The geometry of the tracking mirror 3, heliostat support panel 5, tracking head 1 and the opening of the solar receiver 17 is such that when the sun image from the tracking mirror 3 is centered on the tracking head 1, the sun images from the mirrors of the support panel 5 will also be centered essentially at the solar receiver opening.

The basic mode of operation is to make each heliostat a self-tracker. Each heliostat is switched or connected into a single control circuit for a period of time called the track period. During the track period, the electronic control package 2 generates a power pulse which is transmitted to the cover motor 4 on line 16. In response to this power pulse, the cover motor 4, uncovers the normally covered tracking mirror 3. The sun's rays are then reflected by the tracking mirror 3 and illuminate the face of the tracking head 1. The tracking head 1 measures the tracking error and generates sun tracking error signals which are transmitted to the electronic control package 2 on azimuth and elevation error signal lines 8, 9, and 10, 11. The electronic control package 2 determines the direction, right or left, for azimuth correction and, up or down, for elevation correction of the correction required. The electronic control package 2 then generates a power pulse, one for each axis, transmitted on one line or the other, depending on the direction of the required correction. The power pulse to the azimuth motor 6 is transmitted on either line 12 or 13. The power pulse to the elevation motor 7 is transmitted on either line 14 or 15. The heliostat support panel 5 on which the heliostat mirrors are mounted is rotated by the two motors a fixed angle in each axis. The tracking mirror 3 is also rotated thereby shifting the tracking mirror sun beam which illuminates the tracking head to correct the tracking error originally measured by the tracking head 1. At the end of the tracking period, the power pulse being transmitted on line 16 to the cover motor 4 ends and the tracking mirror 3 is again covered by the cover motor 4.

The electronic control package 2 successively connects for a tracking period, each heliostat in the heliostat array and all the events described above are repeated for each heliostat as it is connected.

The description just completed coveres the fundamental control system mode of operation, tracking the sun so the sun's energy from the heliostat mirrors is concentrated at the opening of the solar receiver 7. The description which follows will consider in more detail the three modes of control system operation, sun track mode, memory track mode and manual track mode.

Figure 2:
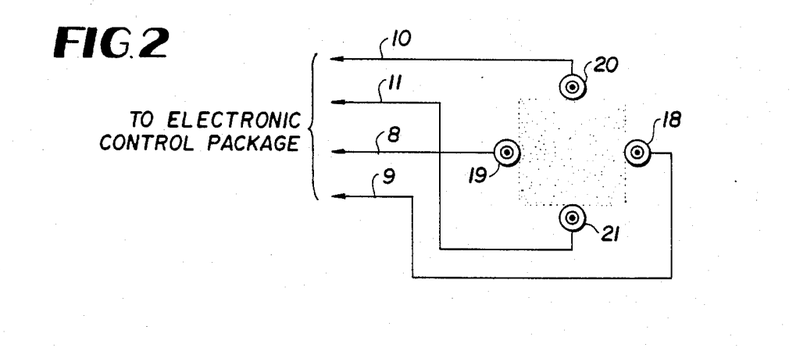
FIG. 2, which shows the physical location of the four sun sensors in the tracking head as used in the present invention.

The operating components in the tracking head 1 are four sun sensors 18, 19, 20, and 21 as shown in FIG. 2. Their function is to measure the image displacement of the sumbeam tracking error, from the tracking mirror 3 and send sun tracking error signals through the two sets of lines 8, 9, and 10, 11. FIG. 2 shows the sunbeam image, shown dotted, so it just fits between the four sensors. An image shift, right or left and or up or down, produces azimuth and elevation error signals which are transmitted from the tracking head 1 through the azimuth and elevation lines, 8 and 9 for azimuth sun tracking error signals and 10 and 11 for elevation sun tracking error signals.

Since the operation of the azimuth and elevation control channels are essentially identical, generally only the azimuth channel will be described. Assuming the image on the face of the tracking head 1 is shifted to the right, thus indicating a right heliostat tracking error, the output from the sun sensor 18 will be larger then the output from sun sensor 19. This error signal, as an unbalanced voltage in the azimuth sun tracking error signal lines 8 and 9 is transmitted to the electronic control package 2. An image shift to the left creates an unbalanced voltage in the lines with the opposite polarity. The elevation axis operates in an identical manner with the output provided on lines 10 and 11.

Figure 3:
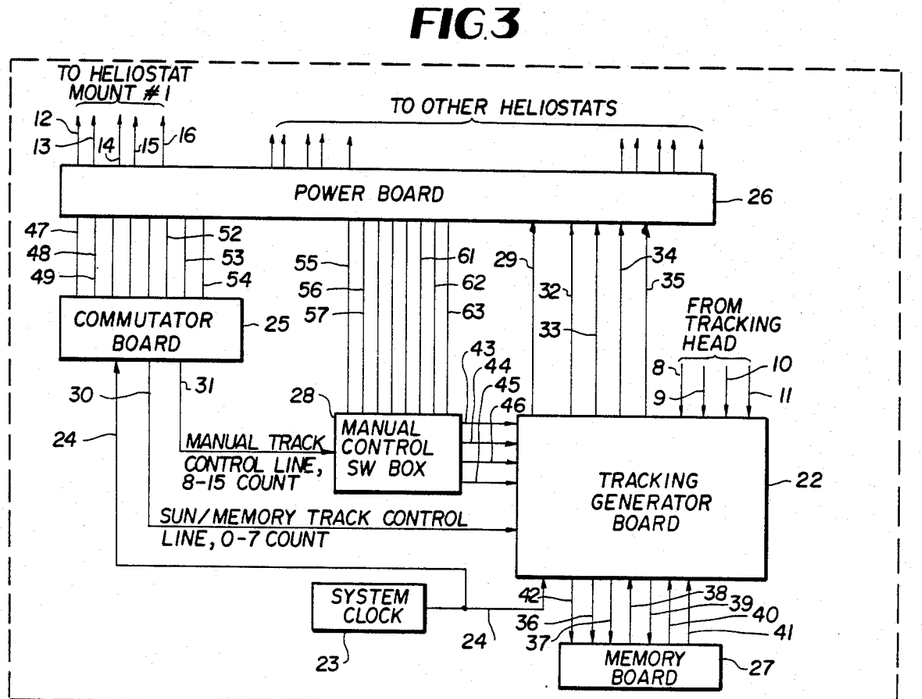
FIG. 3, which is a block diagram of the electronic control package of the present invention.

The electronic control package 2, shown schematically in FIG. 3 consists of the following sub-systems: tracking generator board 22; system clock 23; commutator board 25; power board 26; memory board 27; and manual control switch box 28. The system clock 23 sequences the operational events which occur in the electronic control package 2. For the system described in this invention, it generates timing pulses with a pulse period, for example, of 1.318 seconds. The particular clock pulse period is an arbitrary system choice based on an eight heliostat system and a $16,384 \times 1$ bit memory for each control axis, one memory for the azimuth axis and one memory for the elevation axis. Each of the eight heliostats is assigned 2048 bits of memory for each channel or axis. Tracking data is written in or read out during each day. Tracking data is read out each night. Also, the time during each day is assigned half for sun/memory track and half for manual track operation. During night operation, half of the time is available for memory track operation. The total number of periods required for 24 hours of operation is $16,384 \times 2 \times 2 = 65,536$. This yields a clock period of 1.3184 seconds.

The operation of the electronic control package 2 will be described as a system, with a detailed discussion of the operation of the individual sub-systems within the electronic control package 2 following. The clock pulses from the system clock 23 are fed to the tracking generator board 22 and the commutator board 25 on line 24. The clock pulses initiate the tracking period events in the tracking generator board 22. The first event in the tracking period is the generation of a measuring activation signal pulse, the pulse length of which is about 1 second. This pulse length allows sufficient time for the cover motor 4 to completely raise the tracking mirror cover and for the tracking head 1 to make tracking error measurements. The measuring activation signal pulse is fed to the power board 26 via line 29.

If sunshine is illuminating the tracking mirror 3 during the 1 second period it is uncovered, it will in turn illuminate the face of the tracking head 1 which in turn will generate sun tracking error signals on, for example, lines 8 and 9 of the azimuth channel. The tracking generator board 22 has a control circuit and a sun energy level detection circuit which will switch the signals from lines 8 and 9 into the control circuit for control. Thus, when sunshine is illuminating the tracking head 1, the sun track mode of operation is caused to function within the tracking generator board 22 by the sun energy level detector circuit. In the sun track mode of operation, a right sun tracking error signal, for instance, transmitted to the tracking generator board 22 on lines 8 and 9 will route a tracking drive activation signal pulse to line 32 for transmission to the power board 26, designating a left stepping motor correction. A left sun tracking error signal on lines 8 and 9 will route a tracking drive activation signal pulse to line 33 for transmission to the power board 26, designating a right stepping motor correction. The tracking drive activation signal pulse, which was routed to either line 32 or 33 is generated at the end of the measuring activation pulse period. The tracking drive activation pulse is about 0.1 second long which is sufficient time to step the stepping motors used for azimuth and elevation motor drives to rotate the heliostat support panel 5.

The events just described all occur during a track period. The power board 26, under the direction of the commutator board 25, during the sun/memory track control signal period, determines which heliostat is controlled by the events during the track period. There is a corresponding set of events which occur during the manual track control signal period which will be described hereinafter.

The determination of which heliostat is to be controlled is timed by the system clock 23. The timing pulses generated by the system clock 23 are transmitted to the tracking generator board 22 and each pulse initiates a track period. The timing pulses also sequence a counter in the commutator board 25. The counter addresses a line decoder. These two units in combination provide the following commutator board 25 outputs: Lines 47 through 54, one at a time, are each brought to a high level for one track period during a time interval corresponding to the sun/memory track control period. Each line, when it is held high, transmits a sun/memory enable signal to power board 26. The sun/memory enable signal, received by the power board 26 will route the measuring activation signal being received on line 29 and the tracking drive activation signals being received on either line 32 or 33 for azimuth control and either line 34 or 35 for elevation control to power amplifiers for their respective motors in the heliostat associated with the sun/memory enabling line which is held high. Thus, during the track period, the cover motor 4 for the selected heliostat receives a power pulse via line 16 to uncover the tracking mirror. The sun's rays, reflected by the tracking mirror 3 illuminate the tracking head 1 during this period. The azimuth stepping motor 6 receives a power pulse on either line 12 or 13 to rotate the heliostat support panel 5 either right or left depending on whether a tracking drive activation signal is being transmitted on line 32 or 33. The elevation stepping motor 7 receives a power pulse on either line 14 or 15 to rotate the heliostat support panel 5 either up or down depending on whether a tracking drive activation signal is being transmitted on line 34 or 35. Thus sun tracking operation by the control system is achieved.

The sun energy level detector circuit in the tracking generator board 22 also proivdes a read/write signal to the memory board 27 on line 36 for the azimuth channel and on line 39 for the elevation channel.

The tracking drive activation signals for the azimuth and elevation channels are transmitted to the memory board 27 on lines 37 and 40. Timing pulses which operate to sequence the memory board 27, which provides one storage cell for data per track period for each control axis, are transmitted to the memory board 27 on line 42. The timing pulses, called the sun/memory clock signal are transmitted by the tracking generator board 22 only during the time period corresponding to the sun/memory track control signal period. The memory board 27 operates to store the tracking drive activation signals, thereby in effect storing the angle rotation of the heliostat support panel 5, one step per track period. Thus, in the sun track mode of operation, sun tracking occurs and the memory is loaded with the actual sun track data.

When the sun energy level is down, sun obscured, for example, the system changes from the sun track mode of operation to the memory track mode of operation. The sun energy level detector circuit in the tracking board 22 will detect the change and send a write signal to the memory board 27 on the read/write signal lines 36 and/or 39. The memory board 27 then operates to provide memory tracking correction signals to the tracking board 22 on line 38 for azimuth correction and on line 41 for elevation correction. The sun energy level detector circuit in the tracking generator board 22 will also switch the memory tracking correction signals on lines 38 and 41 from the memory board 27 into the control circuit for control.

In this mode of operation, the memory tracking correction signals, in effect, replace the sun tracking error signals used during the sun track mode of operation. Otherwise the events during each track period and the events during the sun/memory track control signal time period are the same as those which occurred during the sun track control period. Thus, when the sun is obscured by clouds or fog, the support panels in each heliostat continue to track from the memory tracking correction signals.

All operations of the control system described thus far occur during the day operating period. The total number of track periods assigned to the 8 heliostats, for the day operating period, for the system being described, is 32,768. The day operating period is divided into 16,384 total track periods for the sun/memory track control signal time period and 16,384 total track periods for the manual track control signal time period. Each sun/memory track control signal time period contains 8 track periods. Each manual track control signal time period contains 8 track periods.

There are 32,768 total track periods in the night operating period. There are 16,384 total track periods in the sun/memory track control signal time period and 16,384 total track periods in the manual track control signal time period. During the night operating period the memory board 27 operates to provide memory correction signals but with reverse polarity, to the tracking generator board 22. The tracking generator board 22 switches the reverse polarity memory track correction signals on lines 38 and 41 from the memory board 27 into the control circuit for control. Because the polarity of the memory track correction signal is reversed, the heliostat will track in reverse during the night operating period, thus returning each heliostat support panel to the morning start-up position.

In the manual track mode of operation, the commutator board 25 supplies the manual track control signal to the manual control switch box 28 on line 31. The manual control switch box 28 contains two switches for direction control and one for selection control. The two switches for direction control, one for each axis, supply manual tracking correction signals to the tracking generator board 22 on line 45 for azimuth control and on line 46 for elevation control. Azimuth and elevation manual enabling signals are supplied to the tracking generator board on lines 43 and 44. The manual enabling signals switch the manual tracking correction signals into the control circuit for control. The manual enabling signals are also sent to the selection control switch which routes the signal to the power board 26 on one line of the lines 55 through 63. Thus manual track control is achieved. The heliostat to be controlled is selected by the heliostat selection switch, the direction of rotation of the heliostat support panel 5 is controlled by an azimuth manual control switch for azimuth control and an elevation manual control switch for elevation control. The manual track mode of operation can be carried out in both the day operating period and the night operating period.

This completes the description of the electronic control package 2 as a system. The description which follows relates to the sub-systems in the electronic control package.

Figure 4:
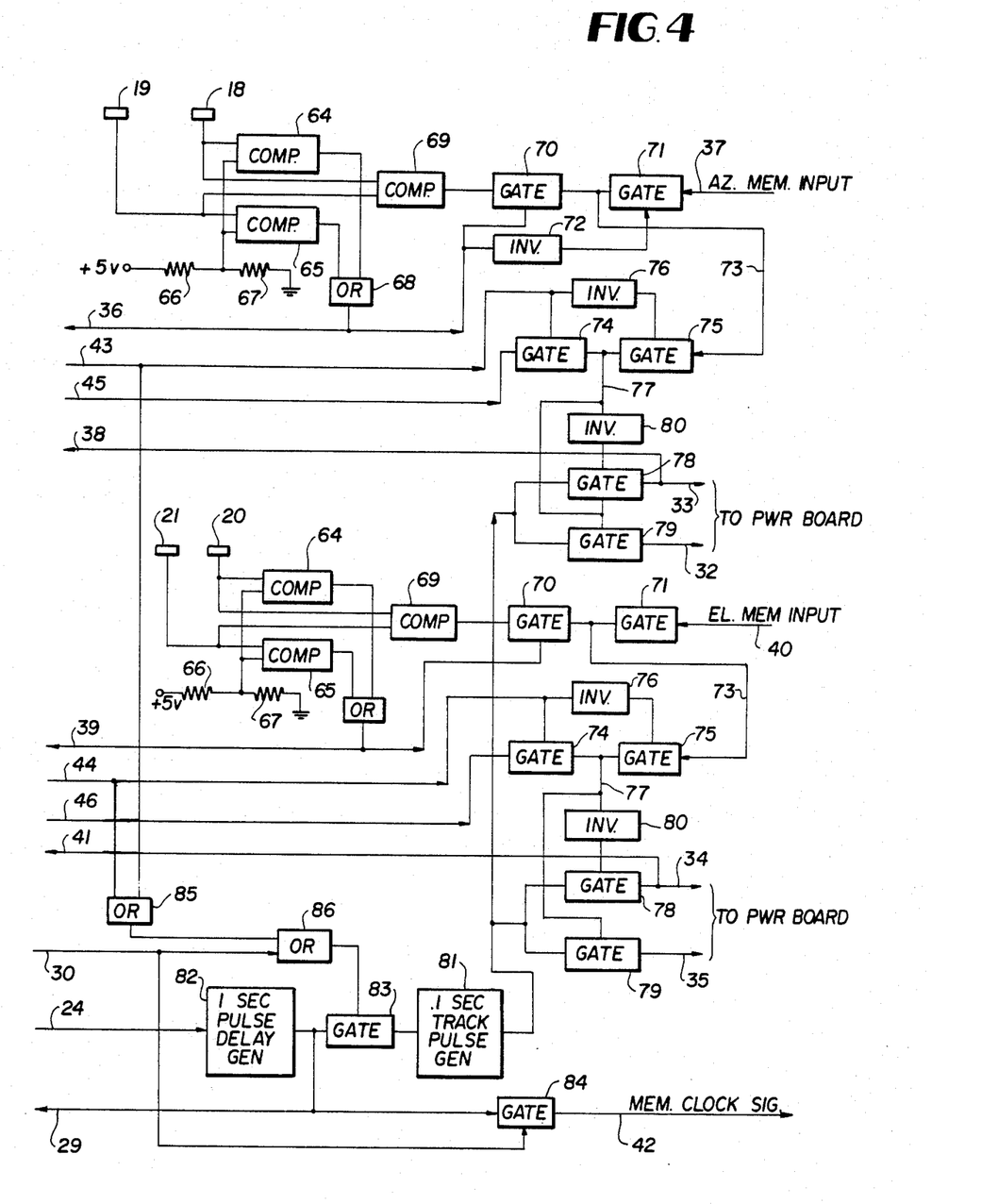
FIG. 4, which is a schematic diagram illustrating the tracking generator board, a sub-system of the electronic control package of the present invention.

The tracking generator board 22, FIG. 4, receives inputs from the tracking head 1 from the four sun sensors 18–21. Sun sensors 18 and 19 provide the inputs for azimuth control during the sun track mode of operation. The azimuth and elevation control channels have almost identical operation, thus the following description of operation applies to both channels.

To describe the events which occur during a track period in the tracking generator board 22, assume the clock pulse on line 24 has initiated the track period, the commutator board 25 has selected the heliostat to be controlled and the power board 26 has sent a power pulse to the cover motor 4, raising the tracking mirror cover. Sun rays, reflected by the mirror then illuminate the tracking head 1. The details of operation within the commutator board 25 and the power board 26 to achieve these events will be discussed hereinafter with reference to FIGS. 6 and 7.

The output voltage of the sun sensors 18 and 19 are supplied to comparators 64 and 65, see FIG. 4. The second input to the comparators 64 and 65 is a voltage whose level is determined by the value of the voltage divider consisting of resistors 66 and 67. If the voltage from the sun sensor 18, due to sun energy level, is greater than the voltage developed by the resistor voltage divider, the output of comparator 64 will be a high voltage. If the comparator input voltage, from the sun sensor 18, is lower than the voltage divider input voltage, the comparator output will be a low voltage. Comparator 65 and its associated sun sensor 19 operates in an identical manner. The outputs from the two comparators are fed to an OR gate 68. Therefore, if either or both sun sensor output voltage exceeds its comparator reference input voltage, OR gate 68 will produce a high output voltage. If both sun sensor output voltages are below their comparator reference voltages, OR gate 68 will produce a low output voltage. These components, comparators 64 and 65 and OR gate 68 constitute the azimuth sun energy level detection circuit.

The output of OR gate 68 is the azimuth read/write signal which is sent to the memory board 27 on line 36 and it is the signal which switches the tracking generator circuit between the sun track and the memory track mode of operation. The output of OR gate 68 is fed directly to a switch gate 70 and to a switch gate 71 through an inverter 72. Switch gates 70 and 71 are in effect single-pole single-throw electronic switches. Sun sensors 18 and 19 provide input voltages to comparator 69 to generate binary tracking error signals used to control the direction of correction signals sent to the stepping motors in the heliostat mounting. When the output from the OR gate 68 is high, the control input to switch gate 70 is high, and switch gate 70 which is normally open is closed. Also, with the control input to switch gate 71 low, because of the inverter 72, switch gate 71 which is normally closed is open. Therefore, the output from comparator 69 is connected to line 73 when the output of OR gate 68 is high due to strong sunlight on the tracking head 1, and the memory input line 37 is conencted to line 73 when the output of OR gate 68 is low due to low or no sunlight on the tracking head 1.

To describe the operation, assume the output voltage of the sun sensor 18 is greater than the output voltage from the sun sensor 19, indicating a right tracking error, then the output of the comparator 69 is a high voltage. If the output of the sun sensor 19 is greater than the output from the sun sensor 18, indicating a left tracking error, the comparator output will be a low voltage. This voltage, high or low, as supplied by comparator 69 to switch gate 70 is the sun error tracking voltage. This error tracking voltage is supplied to line 73, as previously described, only when the sun energy level exceeds the predetermined level established for the system design.

The predetermined sun energy level at which the system changes from the sun track mode to the memory track mode of operation is determined by the ratio of the two resistors, 66 and 67. This ratio is selected during the design stage by the requirement that the sun track mode of operation not be turned on when the sun sensors receive only background energy from the ground and/or surrounding structures and the requirement that the sun track mode be turned on when the sun's rays, reflected from the tracking mirror to the face of the tracking head, varies from noon intensity to late evening or early morning intensity.

Turning now to the manual track mode of operation. The signal input on azimuth manual enabling line 43 is high during the 8 to 15 count of the 4-bit counter in the commutator board 25, if manual correction is being made. If no correction is being made, and the manual correction switch is centered, the signal input on line 43 is low. The azimuth manual switch signal, switches the tracking generator circuit to the manual track mode of operation. Assuming the signal on manual enabling line 43 is high, the control input to switch gate 74 which is a normally open switch is closed. Also, with the control input to the switch gate 75 low, because of inverter 76, the switch gate 75 is open. Therefore, the signal on azimuth manual tracking correction line 45 is connected to line 77 when the manual switch control line 43 signal is high and the sun/memory signal on line 73 is connected to line 77 when the manual switch control line signal is low.

The input signal on manual tracking correction line 45 is a high voltage for right control when the manual control switch in manual control switch box 28 is in the right position. When the switch is in the left position, the signal on line 45 is a low voltage. Therefore, during the 8 to 15 count of the 4-bit counter in the commutator board 25, and if there is a manual control demand, line 77 will receive a low or high voltage signal depending on the correction demanded by the manual directional control switch in the switch box 28. During the 0 to 7 count, the signal on line 43 will always be low, regardless of the manual directional control switch position. During the 0 to 7 count period, line 73 will be connected to line 77 by switch gate 75 which is a closed switch.

The high or low signal on line 77 is fed directly to switch gate 79 and to switch gate 78 through an inverter 80 as the switch gate control signal. If the voltage on line 77 is high, switch gate 79 is a closed switch and switch gate 78 is an open switch. The 1/10 second tracking drive activation pulse generated by the tracking pulse generator 81 is tranmitted through switch gate 79 to line 32. If the voltage on line 77 is low, the tracking drive activation pulse is transmitted through switch 78 to line 33. Lines 32 and 33 transmit the tracking drive activation signal from the tracking generator board 22 to the power board 26 for all three modes of operation, sun track mode, memory track mode and manual track mode of operation.

The operation of the elevation channel is essentially identical to that described for the azimuth channel. The difference is that sun sensors 20 and 21 provide sun energy input voltages in place of sun sensors 18 and 19, and there are corresponding input and output elevation lines. The lines are lines 34 and 35 for transmitting the elevation tracking drive activation signal, line 39 for transmitting the elevation read/write signal, line 41 for transmitting the elevation memory input signal, line 44 for transmitting the elevation manual enabling signal and line 46 for transmitting the manual tracking correction signal.

Six components, the 1/10 second track pulse generator 81, the 1 second pulse delay generator 82, two switch gates 83 and 84 and two OR gates 85 and 86 make up the part of the tracking generator board which is common to both control channels.

The clock pulses, spaced 1.3184 seconds apart, which are transmitted to the tracking generator board on line 24, trigger the pulse delay generator 82. The generator 82 is a one-shot multivibrator. Its output is a positive pulse, one second long. The trailing edge of the positive pulse, triggers the tracking pulse generator 81 if switch 83 is closed, to transmit the signal from the pulse delay generator 82. The tracking pulse generator 81 is also a one-shot multivibrator with a pulse period of 0.1 seconds. The 0.1 second pulse from the tracking pulse generator 81 is supplied to switch gates 79 and 80 in the azimuth control channel and to switch gates 79 and 80 in the elevation control channel.

The two inputs to OR gate 85 are an azimuth manual enabling signal from line 43, and an elevation manual enabling signal from line 44. If either or both of these lines are transmitting a high signal, indicating one or both control switches are positioned for manual control, the output of OR gate 85 is high. The above high signal will only occur during the 8 to 15 count of the 4-bit counter. The high output from gate 85 is transmitted to one input of OR gate 86 whose output is then also a high signal. The high output signal from OR gate 86 is applied as a control signal to switch gate 83, closing the switch thereby allowing pulse delay generator 82 to trigger track pulse generator 81 to supply the 0.1 second track pulse to switch gates 78 and 79. When the signals on the azimuth and elevation manual enabling lines 43 and 44 are low, indicating no manual control is required or the clock count is in the 0 to 7 count period of the 4-bit counter count, the control signal level applied to switch gate 83 is low, the switch is an open circuit and track pulse generator 81 is not triggered. The second input to OR gate 86 is the sun/memory track control signal from line 30. When the signal on line 20 is high, which occurs during the 0 to 7 count of the 4-bit counter, the output of OR gate 86 is high which closes switch gate 83 and track pulses are generated by track pulse generator 81. When the signal on line 30 is low, which occurs during the 8 to 15 count of the 4-bit counter, the output of OR gate 86 is low which opens switch gate 83 and no tracking pulses are generated by track pulse generator 81 in response to the sun/memory track control signal on line 30.

To summarise: track pulses are always generated during the 0 to 7 count of the 4-bit counter and track pulses are generated during the 8 to 15 count of the 4-bit counter when there is a manual control demand in either or both of the control channels. The trailing edge of the 1 second positive pulse, generated by the pulse delay generator 82 also triggers the counter in memory board 27 when switch gate 84 is closed. Switch gate 84 is closed during the 0 to 7 count by the high sun/memory track control signal on line 30. It is opened by the low signal on line 30. The 1 second positive pulse generated by the pulse delay generator 82 is transmitted from the tracking generator board to the memory board 27 on the memory clock signal line 42. The 1 second pulse is transmitted to the power board 26 on line 29 as the measuring activation signal.

The memory function required for the present invention can be implemented in a large number of ways. Therefore, only one way, that of using a standard 16,384×1 memory, one for the azimuth and one for the elevation control channel will be described. The memory board system to be described is shown schematically in FIG. 5.

Figure 5:
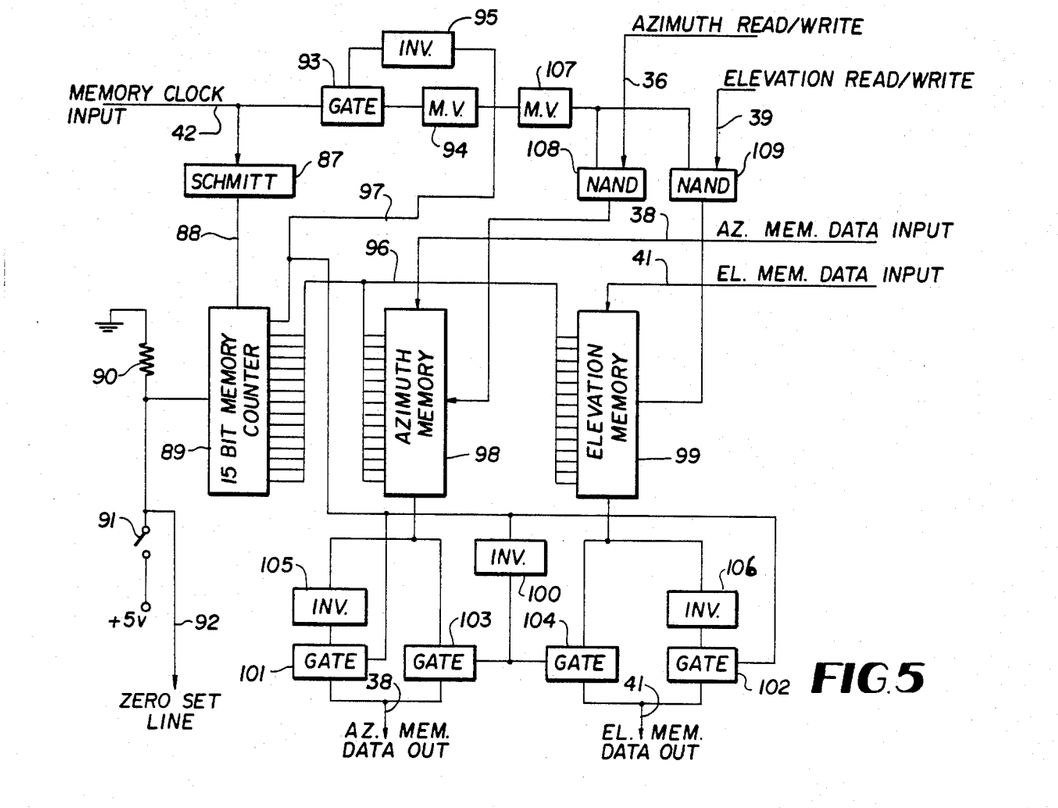
FIG. 5, which is a schematic diagram illustrating the memory board, a sub-system in the electronic control package of the present invention.

The pulses which are transmitted on the memory clock signal line 42, from the tracking generator board 22 to the memory board 27, perform two functions, namely, they advance the count in the 15-bit memory counter 89 and trigger the one shot multivibrator 94. The pulses transmitted on memory clock line 42, must be inverted to advance the memory counter 89 with the proper system timing. The polarity inversion is accomplished by a Schmitt trigger 87.

The 15-bit counter 89 and the 4-bit counter 11 in the commutator board 25 (FIG. 6) must both be set to zero count at the beginning of the first day of system operation. Switch 91, is used to perform this function. In normal operation, the zero set line 92 which is connected to both counters is held at zero voltage. The zero voltage condition is established by resistor 90. Closing switch 91 brings the zero set line 92 to a high voltage. This sets the 15-bit counter and the 4-bit counter to zero count. Opening switch 91 then allows the count to proceed on both counters.

The first 14 address lines 96 from the 15-bit counter provide the signals for the 14 input address lines required by the two memories 98 and 99. The 15th address line from the 15-bit counter 89 is the day/night signal line output 97. The signal on the day/night signal line 97 is low for the day period of operation and high for the night time period of operation. A day, or low signal, on line 97, transmitted to inverter 95, provides a high control signal to switch gate 93. The high control signal will close the switch 93 and the signals on memory clock line 42 will trigger the one-shot multivibrator 94. For night operation, when the voltage on the day/night line is high, the control voltage applied to the switch gate 93 is low, the gate is an open switch and the memory clock pulses can not trigger the multivibrator 94. This prevents writing data by accident into the memories during night time operation.

Assuming day time operation, the pulses which are transmitted on memory line 42 trigger multivibrator 93. The pulse period for multivibrator 94 is short, 0.001 seconds. The trailing edge of the output pulse from the multivibrator 94 triggers the multivibrator 107. The pulse period of the multivibrator is also relatively short, 0.05 seconds.

The above time sequence of pulses is designed to meet the requirements of memories 98 and 99 that the input data for the write cycle must be stable before the write cycle starts and must be stable until after the write cycle is completed. The output of the multivibrator 107 provides the write pulse. The input data to be stored is the 0.1 second pulse signal generated in the tracking generator board 22 and transmittted on line 33 to the power board 26 and on line 36 to the memory board 27 for azimuth control; and transmitted on line 34 to the power board 26 and on line 39 to the memory board 27 for elevation control. The above sequence establishes the required conditions for proper operation of the two memories. The write pulse starts 0.001 seconds after the 0.1 second tracking pulse starts. The write pulse, being only 0.05 second long is completed before the 0.1 second tracking pulse is completed.

When the write pulses are to be supplied to the memories 98 and 99, is determined by the incoming read/write signal being transmitted from the tracking generator board 22. Assuming the control system is operating in the sun track mode, the signal voltage on the read/write lines 36 and 39 from the tracking generator board 22 will be high. A high voltage on one input to NAND gate 108 or 109 and a positive pulse applied to the other input from the multivibrator 94 produces a NAND gate negative pulse output from its normally high voltage output. Thus, memory write occurs during the negative pulse. The memories 98 and 99 require a low voltage input on their read/write input lines for write operation and a high input voltage for read operation.

If now the system shifts from the sun track mode to the memory track mode of operation, the signal voltage on the read/write lines 36 and 39 will be low. A low voltage on one input to NAND gates 108 and 109 and a positive pulse on the other input does not change the output of the NAND gates. Their outputs remain high and memories 98 and 99 operate in the read mode with data outputs on lines 38 and 41.

System operation requires that the data output on the lines 38 and 40 have the same polarity as the stored data for day time operation and reverse polarity for night time operation. For day time operation, the day/night signal on line 97 is low. Inverter 100 changes the polarity of this signal so that a high signal is transmitted to switch gates 103 and 104, thereby closing these two switches. The outputs of memories 98 and 99 are then transmitted through switch gates 103 and 104 to memory board output lines 38 and 41 without a polarity change. During night time operation the high signal on day/night line 97 is transmitted as a control signal to switch gates 101 and 102 thereby closing these two switches. The outputs of memories 98 and 99 are then transmitted through inverters 105 and 106 and through switch gates 101 and 102 to the memory board output lines 36 and 41 with a polarity change.

Figure 6:
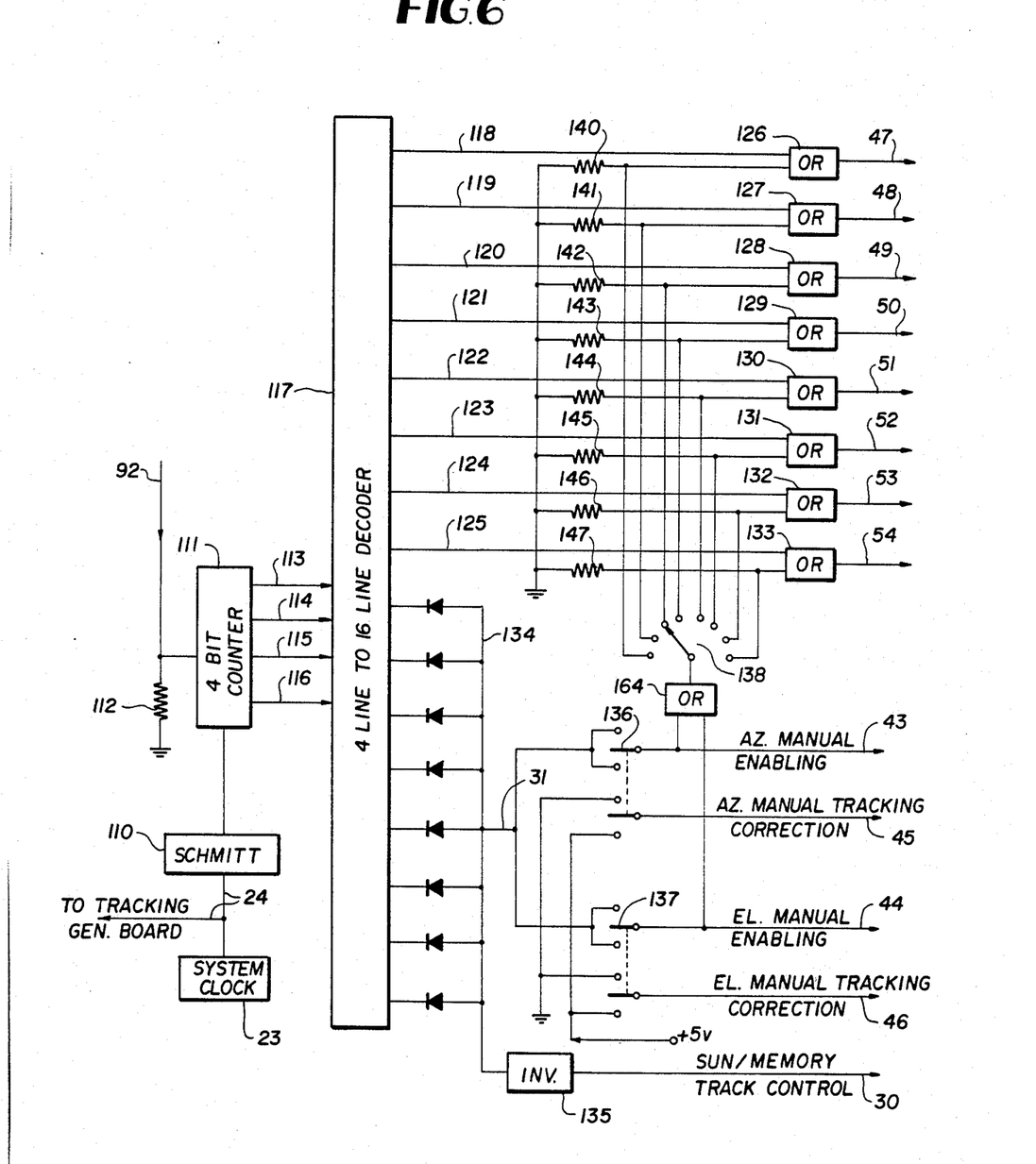
FIG. 6, which is a schematic diagram of the commutation board, system clock and manual control swith box, all sub-systems in the electronic control package of the present invention.

Turning now to FIG. 6, there is illustrated a schematic diagram showing the commutator board 24, the system clock 23 and the manual control switch box 28. The system clock 23 is conventional. It consists of a crystal controlled oscillator which drives a divider to provide output pulses with a frequency of 0.7585 Hertz or a pulse period of 1.3183 second. The clock 23 supplies the timing pulses for the tracking generator board 22 and the 4-bit counter 111 on line 24. The clock timing pulses have the wrong polarity to advance the 4-bit counter 111 with the proper system timing. Polarity inversion is accomplished by a Schmitt trigger 110.

The four address lines 113 through 116 from the 4-bit counter 111 provide the count signal to the four input address lines of the 4-line to 16-line decoder 117. The decoder converts the four line binary coded input from the 4-bit counter 111 into a high signal on one line of the 16 separate output lines. As the count progresses from 0 to 15, the output of each of the 16 output lines, successively changes from the normally low state to a high state for the period of the count.

The first eight decoder output lines 118 through 125 drive one input of eight OR gates 126 through 133. During the 0 to 7 count of the 4-bit counter 111, the lines 118 through 125 are successively brought to a high state. These signals are transmitted through OR gates 126 through 133 successively to bring output lines 47 through 54 successively to the same high state, thereby providing the sun/memory enabling signal required by the power board 26 during the sun/memory track operating period.

The last eight decoder output lines drive 8 diodes which make up in effect an 8-input OR gate 134. During the 0 through 7 count of the 4-bit counter 111, the lines remain at a low voltage state, thus the output of the 8-input OR gate 134 is in a low state. Inverter 135 reverses the polarity of the 8-input OR gate 134 output to supply the sun/memory track control signal on line 30. Thus the sun/memory track control signal is held high during the period output lines 47 through 54 are each successively brought to the high state for each track period during the 0 to 7 count of the 4-bit counter 111.

During the 8 through 15 count, the 8-input OR gate 134 input lines are successively brought to a high state. The output of the 8-input OR gate 134 is therefore continuously held high during the 8 through 15 count, providing the manual control signal supplied to switches 136 and 137 in the manual control switch box 28 on line 31.

The manual track control signal on line 31 is transmitted to the two outer terminals of one half of each of the two three-positioned center-pole center open switches 136 and 137. In operation, during the 8 through 15 count period, the high manual track control signal on line 31 will be transmitted through azimuth manual control switch 136 to one input of OR gate 164 if the switch position is other than center, and will be transmitted through elevation manual control switch 137 to the other input of OR gate 164 if the switch position is other than center. The output of OR gate 164 will be high, during the 8 through 15 count period if either or both switches 136 and 137 are closed. The output of OR gate 164 is provided as an input to the 8-position heliostat selection switch 138. The switch position then determines the line in the 47 through 54 group that received the manual enabling signal.

The output of switch 136 is transmitted to the tracking generator board 22 on line 43 as the azimuth manual enabling signal. The output of switch 137 is transmitted to the tracking generator board 22 on line 44 as the elevation manual enabling signal. When switches 136 and 137 are in the center position, no signal from line 31 is transmitted to any of the output lines.

When both manual control switches, 136 and 137 are open, switches are at the center position, the inputs to the OR gates 126 through 133 from the 8-position heliostat selection switch 139 are left floating. Resistors 140 through 147 provide an electric ground path to keep these lines at a low state. The circuit then operates to provide a high state output on the outputs selected, 47 through 54, during the 8 through 15 count, if a demand is established by either or both of the manual control switches, otherwise the outputs remain at the low state.

The other half of the two manual control three-position double-pole center-open switches is used to provide tracking correction signals to the tracking generator board 22. One outer terminal of each switch is grounded. The other outer terminal is connected to +5 volts. The output of each switch, taken off the center terminal, is a high or low state signal, depending on the position of the switch for other than the center position. These high or low signals are transmitted to the tracking generator board 22 on lines 45 and 46. The azimuth tracking correction signal is transmitted on line 45, the elevation tracking correction signal is transmitted on line 46.

Figure 7:
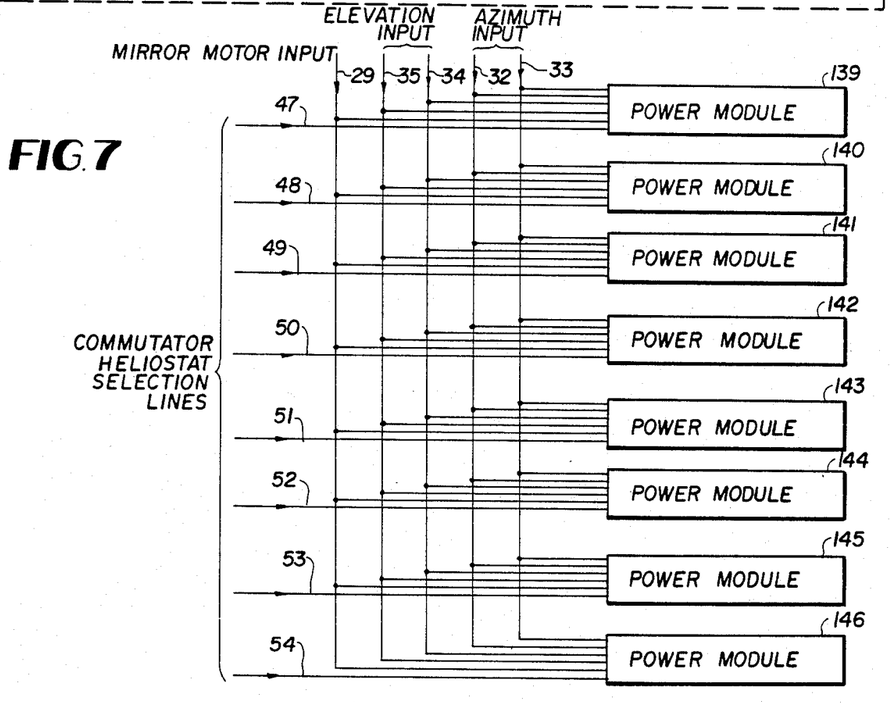
FIG. 7, which is a schematic diagram of the power board, showing three heliostat motors and power circuit sub-system in the electronic control package of the present invention.

Turning now to FIG. 7 which schematically illustrates the power board 26. Input signals are provided during each tracking period as follows:

The azimuth tracking drive activation signal is supplied on either line 32 or 33. The elevation tracking drive activation signal is supplied on either line 34 or 35. The measuring activation signal for the tracking mirror motor 4 on line 29. The above 5 lines are connected to all eight power modules 139 through 146. Sun/memory enabling single lines 47 through 54 from OR gates 126 through 133 in the commutator board 25, one line for each power module, control switches in the power modules 139-146. A high level signal on a sun/memory enabling line, connects the above 5 lines into the circuit. A low signal on a sun/memory enabling line keeps the switches open.

Figure 8:
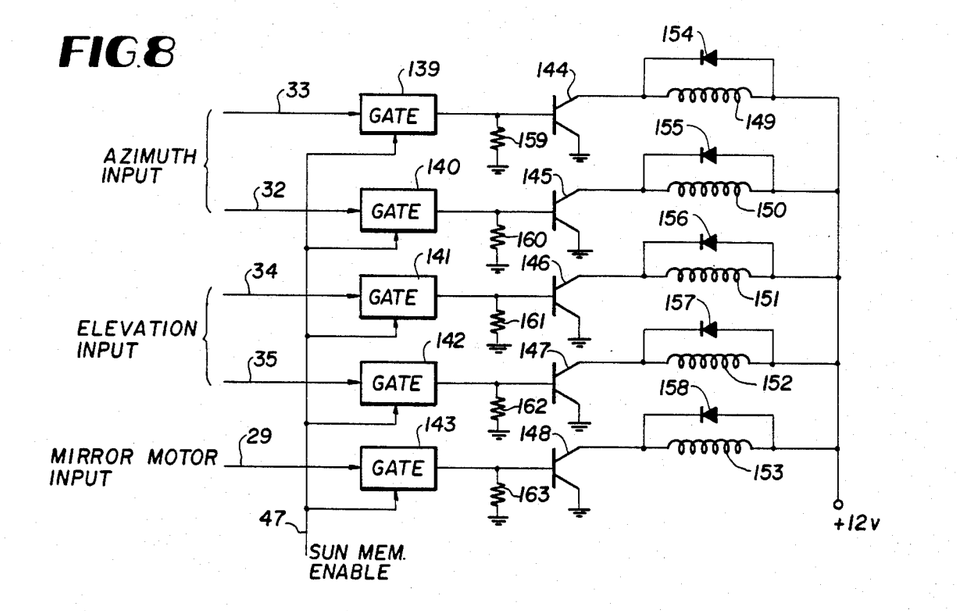
FIG. 8, which is a schematic diagram of one power module of several power modules, each a sub-system in the power board of the present invention.

The power module, shown schematically in FIG. 8, consists of 5 switch gates, two stepping motors, one mirror cover motor and accessory components. The sun/memory enabling line 47 assumed for this description, provides the control signal for the five switch gates 139 through 143. When the signal level on sun/memory line 47 is high, the azimuth tracking drive activation signal on line 32 and 33, the elevation drive activation signal on line 34 and 35 and the measuring activation signal for the tracking mirror cover motor 4 are transmitted to the base of their respective power transistors 144 through 148. The coils of the respective motors 149 for left azimuth control, 150 for right azimuth control of azimuth motor 6, 156 for up elevation control, 157 for down elevation control of elevation motor 7, and 158 for cover motor 4 are connected between the primary 12 volt power supply and the collectors of the corresponding power transistors 144–148. The transistors convert the signal pulses provided on lines 32, 33, 34, 35, and 29 to power pulses to operate the motor.

The five diodes, 154 through 158, connected across the coils, provide a current path to control the reverse voltage, caused by the magnetic field collapse in the motor coils when the power transistor current is cut-off at the end of the signal pulse. The 5 resistors, 159 through 163 provide a ground path for the power transistor base.

Thus, the heliostat or system of heliostats is controlled so that they are always oriented with respect to the sun for optimized reflection of the sun's rays.

I claim:

1. A control system for sequentially controlling the movement of a plurality of heliostats employed in combination with a solar receiver, comprising:

means for controlling the elevational rotational orientation of each heliostat;

means for controlling the azimuthal rotational orientation of each heliostat;

a tracking mirror operatively associated with each heliostat;

tracking means operatively associated with the solar receiver and arranged to receive reflected sun rays from each tracking mirror sequentially, said tracking means including transducer means for generating signals indicative of both the relative elevational and azimuthal rotational orientation of the heliostat being sequenced; and control means connected sequentially to the means for controlling the elevational rotational orientation of each heliostat, the means for controlling the azimuthal rotational orientation of each heliostat, and the tracking means, said control means receiving the signals generated by the transducer means and generating control signals for activating the means for controlling the elevation rotational orientation of each heliostat, and the means for controlling the azimuthal rotational orientation of each heliostat, to thereby adjust the relative elevational rotational and relative azimuthal rotational position of each heliostat, so that sun rays reflected by the heliostat are received by the solar receiver, wherein:

(i) the transducer means comprises four solar sensors arranged in any array on the perimeter of the image of a sun ray received by the tracking means, such that two of said sensors are displaced along a horizontal axis to generate a signal related to aximuth orientation of the heliostat being sequenced and the other two of said sensors are displaced along a vertical axis to generate a signal related to elevational orientation of the heliostat being sequenced;

(ii) said control means including:

a tracking generator board connected to the tracking means;

a power board connected to the tracking generator board, to the means for controlling the elevational rotational orientation of each heliostat, and to the means for controlling the azimuthal rotational orientation of each heliostat;

a commutator board connected to the tracking generator board and to the power board; and a system clock connected to the tracking generator board and to the commutator board;

(iii) the tracking generator board when activated by the system clock generates tracking drive activation signals from the transducer generator signals, said tracking drive activation signal being applied to said power board which generates the control signal for activating the means for controlling the elevational rotational orientation of each heliostat and the means for controlling the aximuthal rotational orientation of each heliostat; and (iv) the commutator board controls the generation of said tracking drive activation signal by the tracking generator board in sequence among the heliostats.

2. A control system for sequentially controlling the movement of a plurality of heliostats employed in combination with a solar receiver, comprising:

means for controlling the elevation rotational orientation of each heliostat;

means for controlling azimuthal rotational orientation of each heliostat;

a tracking mirror operatively associated with each heliostat;

tracking means operatively associated with the solar receiver and arranged to receive sun rays from each tracking mirror sequentially, said tracking means including transducer means for generating signals indicative of both the relative elevational and azimuthal rotational orientation of the heliostat being sequenced; and control means connected sequentially to the means for controlling the elevational rotational orientation of each heliostat, the means for controlling the azimuthal rotational orientation of each heliostat, and the tracking means, said control means receiving the signals generated by the transducer means and generating control signals for activating the means for controlling the elevation rotational orientation of each heliostat, and the means for controlling the azimuthal rotational orientation of each heliostat, to thereby adjust the relative elevational rotational and relative azimuthal rotational position of each heliostat, so that sun rays reflected by the heliostat are received by the solar receiver, wherein:

(i) the transducer means comprises four solar sensors arranged in any array on the perimeter of the image of a sun ray received by the tracking means, such that two of said sensors are displaced along a horizontal axis to generate a signal related to azimuthal orientation of the heliostat being sequenced and the other two of said sensors are displaced along a vertical axis to generate a signal related to elevational orientation of the heliostat being sequenced;

(ii) said control means including:

a tracking generator board connected to the tracking means;

a power board connected to the tracking generator board, to the means for controlling the elevational rotational orientation of each heliostat, and to the means for controlling the aximuthal rotational orientation of each heliostat;

a commutator board connected to the tracking generator board and to the power board;

a system clock connected to the tracking generator board and to the commutator board; and manual control switch means connected to the tracking generator board, the power board and the commutator board; and (iii) the manual control switch means includes an elevational control switch, an azimuthal control switch and a heliostat selection control switch, the elevational control switch and the azimuthal control switch are connected to the tracking generator board, and the heliostat selection control switch is connected to the power board.

3. A control system for sequentially controlling the movement of a plurality of heliostats employed in combination with a solar receiver, comprising:

means for controlling the elevation rotational orientation of each heliostat;

means for controlling the azimuthal rotational orientation of each heliostat;

a tracking mirror operatively associated with each heliostat;

tracking means operatively associated with the solar receiver and arranged to receive reflected sun rays from each tracking mirror sequentially, said tracking means including transducer means for generating signals indicative of both the relative elevational and azimuthal rotational orientation of the heliostat being sequenced;

control means connected sequentially to the means for controlling the elevational rotational orientation of each heliostat, the means for controlling the azimuthal rotational orientation of each heliostat, and the tracking means, said control means receiving the signals generated by the transducer means and generating control signals for activating the means for controlling the elevation rotational orientation of each heliostat, and the means for controlling the azimuthal rotational orientation of each heliostat, to thereby adjust the relative elevational rotational and relative azimuthal rotational position of each heliostat, so that sun rays reflected by the heliostat are received by the solar receiver; and cover means connected to said control means for covering the tracking mirror, wherein:

(i) the transducer means comprises four solar sensors arranged in any array on the perimeter of the image of a sun ray received by the tracking means, such that two of said sensors are displaced along a horizontal axis to generate a signal related to azimuth orientation of the heliostat being sequenced and the other two of said sensors are displaced along a vertical axis to generate a signal related to elevational orientation of the heliostat being sequenced;

(ii) said control means including:

a tracking generator board connected to the tracking means;

a power board connected to the tracking generator board, to the means for controlling the elevational rotational orientation of each heliostat, to the means for controlling the azimuthal rotational orientation of each heliostat and to the cover means for each tracking mirror;

a commutator board connected to the tracking generator board and to the power board; and a system clock connected to the tracking generator board and to the commutator board.

(iii) the tracking generator board comprises a first pulse delay generator which receives pulses from the system clock and generates a measuring activation signal pulse; and (iv) the power board receives the measuring activation signal pulse and generates a control signal which is applied to the cover means for moving the cover means relative to the tracking mirror.

4. The control system as defined in claim 1, wherein the control means further includes:

a memory board connected to the tracking generator board, and wherein the tracking generator board further comprises:

an azimuth sun energy detection circuit connected to the azimuth orientation solar sensors;

an elevation sun energy detection circuit connected to the elevation orientation solar sensors; and a tracking generator circuit connected to the azimuth sun energy detection circuit, the elevation sun energy detection circuit, the memory board and the power board, for switching between a sun track mode of operation with the azimuth sun energy detection circuit and the elevation sun energy detection circuit connected to the power board, and a memory track mode of operation with the memory board connection to the power board.

5. A control system for sequentially controlling the movement of a plurality of heliostats employed in combination with a solar receiver, comprising:

means for controlling the elevation rotational orientation of each heliostat;

means for controlling the azimuthal rotational orientation of each heliostat;

a tracking mirror operatively associated with each heliostat;

tracking means operatively associated with the solar receiver and arranged to receive reflected sun rays from each tracking mirror sequentially, said tracking means including transducer means for generating signals indicative of both the relative elevational and azimuthal rotational orientation of the heliostat being sequenced; and control means connected sequentially to the means for controlling the elevational rotational orientation of each heliostat, the means for controlling the azimuthal rotational orientation of each heliostat, and the tracking means, said control means receiving the signals generated by the transducer means and generating control signals for activating the means for controlling the elevation rotational orientation of each heliostat, and the means for controlling the azimuthal rotational orientation of each heliostat, to thereby adjust the relative elevational rotational and relative azimuthal rotational position of each heliostat, so that sun rays reflected by the heliostat are received by the solar receiver, wherein:

(i) the transducer means comprises four solar sensors arranged in any array on the perimater of the image of a sun ray received by the tracking means, such that two of said sensors are displaced along a horizontal axis to generate a signal related to azimuth orientation of the heliostat being sequenced and the other two of said sensors are displaced along a vertical axis to generate a signal related to elevational orientation of the heliostat being sequenced; and (ii) said control means including:

a tracking generator board connected to the tracking means;

a power board connected to the tracking generator board, to the means for controlling the elevational rotational orientation of each heliostat, and to the means for controlling the azimuthal rotational orientation of each heliostat;

a commutator board connected to the tracking generator board and to the power board;

a system clock connected to the tracking generator board and to the commutator board; and a memory board connected to the tracking generator board, said memory board including: a counter; a memory for storing azimuth data generated by the counter; a memory for storing elevation data generated by the counter; and switch means for switching the memories between read and write modes.

6. The control system as defined in claim 1, wherein the commutator board includes a counter, and a decoder connected at its input to the counter and at its output to the power board and the manual control switch, and wherein the control means further includes:
zero out switch connected to the memory board counter and the commutator board counter.

7. A control system for sequentially controlling the movement of a plurality of heliostat employed in combination with a solar receiver, comprising:
means for controlling the elevation rotational orientation of each heliostat;
means for controlling the azimuthal rotational orientation of each heliostat;
a tracking mirror operatively associated with each heliostat;
tracking means operatively associated with the solar receiver and arranged to receive reflected sun rays from each tracking mirror sequentially, said tracking means including transducer means for generating signals indicative of both the relative elevational and azimuthal rotational orientation of the heliostat being sequenced;
control means connected sequentially to the means for controlling the elevational rotational orientation of each heliostat, the means for controlling the azimuthal rotational orientation of each heliostat, and the tracking means, said control means receiving the signals generated by the transducer means and generating control signals for activating the means for controlling the elevation rotational orientation of each heliostat, and the means for controlling the azimuthal rotational orientation of each heliostat, to thereby adjust the relative elevational rotational and relative azimuthal rotational position of each heliostat, so that sun rays reflected by the heliostat are received by the solar receiver; and
cover means connected to said control means for covering the tracking mirror, wherein:
(i) the transducer means comprises four solar sensors arranged in any array on the perimeter of the image of a sun ray received by the tracking means, such that two of said sensors are displaced along a horizontal axis to generate a signal related to azimuth orientation of the heliostat being sequenced and the other two of said sensors are displaced along a vertical axis to generate a signal related to elevational orientation of the heliostat being sequenced;
(ii) said control means including:
a tracking generator board connected to the tracking means;
a power board connected to the tracking generator board, to the means for controlling the elevational rotational orientation of each heliostat, to the means for controlling the azimuthal rotational orientation of each heliostat and to the cover means for each tracking mirror;
a commutator board connected to the tracking generator board and to the power board; and
a system clock connected to the tracking generator board and to the commutator board; and
(iii) the power board includes a power module circuit for each heliostat, wherein each power module circuit receives an azimuth input signal, an elevation input signal, and a mirror motor input signal from the tracking generator board and a heliostat selector input signal from the commutator board, each power module circuit including a stepping motor for elevation control, a stepping motor for azimuth control, a motor for mirror cover control and a switch circuit for switching between the respective motors.

* * * * *